Patented July 10, 1945

2,380,166

UNITED STATES PATENT OFFICE 2,380,166

EMULSIONS

William C. Griffin, Tamaqua, Pa., assignor to Atlas Powder Company, Wilmington, Del., a corporation of Delaware No Drawing. Application May 27, 1941, Serial No. 395,392

18 Claims. (Cl. 252—311.5)

The present invention relates to improvements in emulsions.

An object of the invention is to provide a new emulsifier composition.

Another object is to provide an emulsifier composition which disperses readily in water.

Another object is to provide an emulsifier composition which is capable of forming stable emulsions of waxes and water.

Another object is to provide emulsions of oil and water comprising my novel emulsifier composition.

A further object is to provide emulsions which are stable to dilution with hard water.

A still further object is to provide wax emulsions of improved properties.

This application is in part a continuation of my copending application Serial Number 367,017, filed November 25, 1940.

Emulsions have long been made with long chain fatty acid partial esters of polyhydric alcohols or other polyhydroxy materials. There are definite advantages attending the use of emulsifiers of this type. In many instances, however, it has been found impossible to prepare emulsions of desirable oleaginous materials with these emulsifiers. These partial esters are also imperfect emulsifiers in that they are practically insoluble and very difficult to disperse in water, many of them being impossible to disperse. It has been proposed to improve dispersibility of these esters by including in them, or in the water, a soap or soap-forming alkaline substance. In some cases an improvement can be noted but the disadvantages of soap as an emulsifier are then encountered.

I have found that in accordance with the present invention, emulsifying compositions of improved properties result from the combination of a lipophilic long chain fatty acid partial ester of a polyhydroxylic material and a highly hydrophilic hydroxy-polyoxyethylene ether of a partial ester of said type. The natures of these ingredients will be described more in detail hereinafter. By combining materials of these types I am able to prepare emulsifiers which are much more readily dispersible in water than the partial esters by themselves. Furthermore, the combinations are emulsifiers of much greater versatility than the partial esters by themselves. The highly hydrophilic hydroxy-polyoxyethylene ethers of the partial esters, by themselves, are not particularly efficient emulsifiers for most purposes. The combination of these two types of ingredients has properties not possessed by either of them alone.

My combination emulsifiers have the property of resistance to hard water. In this respect particularly they are outstanding by comparison with the partial esters rendered more dispersible by the addition of soaps.

Emulsions of an oil phase, water, and my combination emulsifier have many uses and advantages. The novel emulsifying composition makes it possible to prepare usefully stable emulsions of oils and waxes which are generally classified as very difficultly emulsifiable. The emulsions according to this invention can be prepared in a concentrated form and later diluted, even with hard water, to the desired degree without destroying the emulsion.

A particular advantage of my invention is in the use of the combination emulsifiers to emulsify waxes, particularly paraffin waxes. The resulting emulsions exhibit very desirable properties and have many uses.

Waxes of various types have very wide industrial applications, particularly in the field of coatings. For example, paraffin wax is a very valuable and readily available coating agent for paper, paper board, composition board of various kinds, cloth, textiles and the like in which uses the paraffin acts to reduce absorbency, to waterproof, to improve the feel, etc. Another use of paraffin is in the field of laundry waxes in which paraffin, either alone or mixed with other materials, is incorporated into starch used in laundering for the purpose of imparting a lubricant for ironing and also to improve the appearance of the ironed fabric.

In the field of coating, it is recognized as a definite advantage to be able to use the paraffin in the form of an emulsion in water. Such emulsions are economical to prepare and use and the vehicle is one which does not involve expense nor is it undesirable for application to most objects. In the past, however, the usual emulsifiers for paraffin waxes have been soaps, either alkali metal soaps or soaps of the strong organic nitrogen bases such as triethanolamine. The emulsions produced from soaps have numerous defects among which is the outstanding disadvantage that they cannot be diluted with hard water without causing a precipitation of the soap and consequent breaking of the emulsion.

In the field of the laundry waxes and the like, it is desirable to prepare a solid dispersible wax composition, which can be added to a hot water solution of starch, and used for wax-starching fabrics in the usual manner. In the past the wax compositions have been prepared by incorporating such materials as natural emulsifying waxes with the paraffin wax, but such waxes are not entirely satisfactory and furthermore, being natural products, are subject to wide variation in quality, price and quantity available.

For convenience in description my emulsifiers will be described generally as a mixture of type A and type B emulsifiers.

In type A are included, in accordance with the invention, lipophilic partial long-chain fatty acid esters of poly-hydroxylic organic compounds. Type B includes, in general, the highly hydrophilic hydroxy-polyoxyethylene ethers of type A compounds.

I have used the adjective "lipophilic" to indicate the property of a polar compound (partial ester of polyhydroxy substance) which has good oil-solubility or dispersibility and no, or very little, water-solubility. The term "highly hydrophilic" is used to signify a compound which is from readily dispersible in to completely miscible with water.

More particularly, the type A esters are obtained by combining water-insoluble organic acids, especially fatty acids having at least 12 carbon atoms, such as those obtainable by hydrolysis of natural fats, oils, and waxes, or from the oxidation of paraffins, with suitable aliphatic polyhydroxylic compounds. Water-insoluble cyclic acids, such as naphthenic acids, can also be used in the preparation of the partial esters. Suitable polyhydroxylic compounds comprise ethylene glycol; di- and tri-ethylene glycol; glycerol and polyglycerols; pentaerythritol; pentitols; hexitols and the cyclic inner ethers thereof; cyclitols such as inositol; aligosaccharides such as glucose, sucrose and lactose; the glycol and lower polyglycol ethers of such polyhydroxylic compounds; and other polyhydric compounds of typically hydrophile character.

I have found that very good results are obtained from the esters of the mixed cyclic inner ethers of the hexitols, such as sorbitans and sorbides from sorbitol, or mannitans and mannides from mannitol.

In these type A partial esters, monoesters tend to be the most effective.

Furthermore, for esters of the polyhydroxylic compounds derivable from the hexitols, I have found that the ratio of hydroxyl value to ester value for optimum performance lies between 3 and 1, and preferably between 3 and 1.5.

These partial esters may be prepared by any one of several known methods; such as by direct esterification of the polyhydroxy material with free fatty acid or by alcoholysis of naturally occurring esters with polyhydroxy material, using suitable catalysts. With heat-sensitive polyhydroxylic compounds, the acid chlorides and pyridine or other suitable base may be employed.

For the preparation of my preferred type A esters, I use, as starting materials, mannitol, sorbitol, or the mixture of sorbitol and hexane pentols obtainable by the reduction of glucose, and react these polyalcohols with the organic acids under conditions leading to the formation of the corresponding cyclic inner ethers and the esterification thereof by the acid. Alternatively, I may preform the inner ethers or mixtures thereof and esterify by known methods. The following illustrate the preparation of my preferred type A esters:

*Example 1*

182 g. (1 mol) of mannitol and 256 g. (1 mol) palmitic acid were heated together in the presence of .05% NaOH based upon total reactants as catalyst. An atmosphere of inert gas was maintained in the reaction vessel and the ingredients were thoroughly stirred. The temperature was brought to 240° C. in 70 minutes and held at that value for 5 hours. 13 g. of decolorizing carbon were added 30 minutes before the end of the reaction period and the batch filtered. The resulting product, chiefly mannitan monopalmitate, was a yellow, waxy solid melting at 42–45° C., insoluble and difficultly dispersible in water. The hydroxyl value was 355 and the ester value was 146.

*Example 2*

182 g. (1 mol) of mannitol and 284 g. (1 mol) stearic acid were heated together in the presence of .05% NaOH as catalyst. An atmosphere of inert gas was maintained in the reaction vessel and the ingredients were thoroughly stirred. The temperature was brought to 250° C. in 70 minutes and held at that value for 5 hours.

9 g. decolorizing carbon were added 30 minutes before the end of the reaction period and the batch filtered. The resulting product, chiefly mannitan monostearate, was a light gray, brittle, waxy material, melting at 45–48° C., insoluble and undispersible in water. The hydroxyl value was 301, and the ester value was 150.

The type B material, the second component of my novel combination emulsifier, comprises the highly hydrophilic and preferably the readily water-soluble hydroxy-polyoxyethylene ethers of the type A partial esters. These ethers can be prepared by methods known to those skilled in this art. Thus, I may etherify the partial ester by heating with a preformed polyethylene glycol, or, more conveniently, by reacting the ester with ethylene oxide in the presence of suitable catalysts.

The ether-ester becomes more hydrophilic with increase in the number of $C_2H_4O$ units per mol. I have found it particularly advantageous to react the ester with from 10 to 30 mols of ethylene oxide. The longer the fatty acid radical in the ester and the greater the degree of esterification (mono-, di-, etc., ester) the more $C_2H_4O$ units required for optimum results.

The following examples illustrate the preparation of such ethers:

*Example 3*

80 lbs. (⅕ mol) of the product of Example 1 were melted and introduced into a stirring autoclave. Heat was applied and when the temperature reached 100° C., 72.5 g. of dry sodium methylate were added as catalyst.

When the temperature reached 110° C., introduction of liquid ethylene oxide was started. In the course of 2.5 hours 176 lbs. (4 mols) ethylene oxide were added, the temperature being controlled within the range of 105 to 110° C. by the use of a cooling coil in the autoclave. The temperature was maintained at 105 to 110° C. until the ethylene oxide was consumed as indicated by return of the pressure to atmospheric.

The product was transferred to a vacuum kettle and blown with superheated steam (at 150° C.) under 10 mm. pressure with good agitation for 30 minutes. 2% of activated carbon were added and heating continued for 15 minutes after which the batch was filtered.

The weights of starting materials taken correspond to 20 mols ethylene oxide to 1 mol of ester, calculated as mannitan monopalmitate.

The product was an odorless, amber slightly viscous liquid, miscible with water in all proportions at room temperature.

*Example 4*

430 g. of the product of Example 2 were introduced into a pressure reaction bomb. 22 g. sodium methylate were added and the mixture chilled. 440 g. liquid ethylene oxide were added and the bomb capped. The reaction vessel was put in a rocking device and heat applied gradually until reaction set in as indicated by a rapid rise in temperature. The temperature was maintained at 100° C. and the maximum pressure developed was 138 lbs/in.² After the main reaction had subsided, the temperature was maintained at 100° C. until the pressure had dropped to atmospheric. The total time at 100° C. was 5 hours. The product was treated with superheated steam according to the process of Example 3. The final product was a gelatinous solid having a hydroxyl value of 193 and an ester value of 75. The compound contained approximately 10 mols ethylene oxide per mol of original ester (calculated as mannitan monostearate). This material was readily dispersible in water at room temperature.

The proportion of the A and B types of emulsifiers in my combination is susceptible of wide variation. It will be understood by those skilled in the art that a combination which is best suited for one set of conditions may not be the optimum combination for a different set of conditions. The character of the oil phase, the character of the aqueous phase, the particular combination of A and B employed, conditions of use such as dilution, temperature, degree of agitation, etc., are factors to be considered in determining the best combination in a given case.

It is useful in many cases to express the proportion of A and B in terms of the ratio of $C_2H_4O$ units in B to the total ester in A and B. For a given set of conditions the limiting values for the ratio are readily determinable and a range thereby delineated.

This ratio may be calculated from the weights and molecular weights of A and B according to the following formula:

$$\text{Ratio} = \frac{M_a W_b n}{M_a W_b + M_b W_a}$$

wherein
$M_a$ = molecular weight of A
$M_b$ = molecular weight of B
$W_a$, $W_b$ = weights of A and B respectively
$n$ = number of $C_2H_4O$ units per mol of B In the case of the waxes the preferred ratio lies in the range 1.5 to 9. Where the water contains another emulsifier or suspending agent the ratio may be lower. In the case of laundry starching wax compound the oil phase must be emulsifiable in a hot starch solution. In such a case it has been found that still lower values for the ratio are operative.

Using hexitan or hexide derivatives for emulsifying hard paraffin waxes I have found preferable a composition in which the value for this ratio lies between 4 and 5. Softer waxes and waxes mixed with other materials such as fats can be emulsified with compositions having other optimum values for this ratio.

Emulsions of oils or fats can generally be prepared within the ratio values 1.5 to 9 but for specific cases variations may be desirable.

It will be readily apparent to those skilled in the art that the amount of the combination emulsifier in a given emulsion will depend on the kind of material to be emulsified, the aqueous phase, and the conditions of use. The subsequent examples illustrate some of the possible variations in the amount of combination emulsifiers.

The waxes which I contemplate emulsifying correspond to the broad definition of paraffin wax as used in the petroleum industry and also include similar waxes such as the fossil waxes and mineral waxes found in nature as distinguished from those produced in the refining of petroleum. Thus, among the petroleum paraffin waxes I can use an ordinary white wax such, for example, as the material marketed by Socony-Vacuum Oil Company under the trade-mark "Paraseal" which is an ordinary household paraffin wax. Another petroleum paraffin that I can use is crude scale wax. Further waxes which can be used are those of the microcrystalline type obtained in the refining of petrolatum such as that sold by Socony-Vacuum Oil Company under the name "Cerese Wax AA." Many other petroleum paraffin waxes are known and will be found applicable in my invention.

Among the waxes of nonpetroleum origin may be mentioned ozokerite, ceresin, and montan waxes. These natural or fossil waxes have physical properties approximating those of the petroleum paraffin waxes and may be substituted for them in many emulsions.

The waxes listed above are not true waxes in the strict chemical sense of the word but are generally known by this term in the trade. I may also use the true waxes such as beeswax, or carnauba wax, but the true animal and vegetable waxes in general are more easily emulsified than the mineral types of waxes and do not present as difficult a problem. Whenever I use the word "wax" without modification it is intended to include both the waxes properly so-called and the wax-like materials of mineral origin.

The invention also includes the preparation of emulsions of waxes mixed with other materials, thus, for example, it may be desirable to add a fat or oily material to a paraffin wax either to reduce its melting point or to impart some desired characteristic to the coating or other final product.

Other oleaginous materials which I can emulsify according to my invention are various light fractions of petroleum; lubricating oils; vegetable oils, such as cottonseed, corn, olive and castor; hydrogenated castor oil; fats such as stearin; water-insoluble and difficultly dispersible synthetic esters such as mannitan monostearate and mannide dipalmitate. This list is intended merely by way of example and the invention is not limited to emulsions of these substances.

In the subjoined claims the term "oil phase" is used merely to indicate the non-aqueous phase of the emulsion, in accordance with standard usage in emulsion chemistry.

The following examples illustrate the preparation of paraffin wax emulsions with an emulsifier of the present invention:

*Example 5*

A stock emulsion of a refined household paraffin wax was prepared as follows:

3.5 grams of the product of Example 1 and 3.5 grams of the product of Example 3 were dispersed in 40 gram molten paraffin wax. 53 grams hot water were poured into this mixture with agitation and the agitation was continued while the mixture cooled.

The resulting emulsion was remarkably stable and could be diluted with at least 9 times its weight of water to yield stable emulsions. The water could be very hard (for instance, 20,000 parts per million as calcium carbonate) without adversely affecting the stability of the emulsion.

In this example the ratio of combined ethylene oxide to total ester is 4.8 to 1, calculated as follows from the formula set out above:

$$\text{Ratio} = \frac{402 \times 3.5 \times 20}{(402 \times 3.5) + (1282 \times 3.5)}$$

wherein $M_a = 402$ (theory for mannitan monopalmitate)
$M_b = 1282$ (theory for mannitan monopalmitate plus 20 mols $C_2H_4O$)
$W_a = 3.5$
$W_b = 3.5$
$n = 20$

Example 6

A satisfactory emulsifier for paraffin wax was prepared by melting together 40 parts of the product of Example 1 and 60 parts of a type B composition produced by reacting 1 mol of the same ester and 12 mols $C_2H_4O$. This emulsifier was substituted for the mixed emulsifier of the above example and resulted in a stable emulsion.

The ratio of combined ethylene oxide to total ester in 4.7 to 1 in this composition (calculated by the formula given above).

Example 7

Another good emulsifier for paraffin wax is composed of 50 parts of the lipophilic reaction product of mannitol and myristic acid in a mol-for-mol ratio, said product having a hydroxyl number of 351 and an ester value of 152, and 50 parts of the type B product obtained by reacting 1 mol of the said reaction product with 20 mols ethylene oxide. This final combination has a ratio of combined ethylene oxide to total ester of 4.6 to 1 (calculated by the formula given above, taking the molecular weights to be those of mannitan monomyristate and the ether thereof with 20 mols $C_2H_4O$).

Example 8

An emulsifier comprising an 18-carbon atom fatty acid derivative was prepared by mixing 34 parts of the ester of Example 2 and 66 parts of the product of Example 4. This mixed emulsifier had a value for the ratio of combined ethylene oxide to total ester of 3.9 to 1 (calculated by the formula given above, taking the molecular weights to be those of mannitan monostearate and the ether thereof with 10 mols $C_2H_4O$).

Example 9

An emulsifier comprising an unsaturated fatty acid derivative was prepared by mixing 50 parts of the lipophilic ester produced by reacting sorbitol with oleic acid in a mol-for-mol ratio, said ester having a hydroxyl value of 249 and an ester value 145, and 50 parts of the type B ether produced by reacting 1 mol of said ester with 20 mols ethylene oxide. The ratio of combined ethylene oxide to total ester of this mixture was 4.9 to 1 (calculated by the formula given above, taking the molecular weights to be those of mannitan monooleate and the ether thereof with 20 mols $C_2H_4O$).

Example 10

An emulsion of a crude scale paraffin wax was prepared by mixing 2.8 grams of the ester of Example 1 and 4.2 grams of the ether of Example 3 with 40 grams of the wax. This mixture was melted together as before and 53 grams of water added with constant agitation. The agitation was continued as the mixture cooled. A stable emulsion resulted. In this example the ratio of combined ethylene oxide to total ester was 6.4 to 1.

Example 11

A concentrated emulsion of a so-called microcrystalline wax (Cerese Wax AA of the Socony-Vacuum Oil Co.) was prepared by using, as the combination emulsifier, 57% of the ester of Example 1, and 43% of the ether of Example 3. 40 parts of the wax and 7 parts of emulsifier were melted together, 53 parts hot water added with agitation, and the agitation continued during cooling to room temperature. In this example the ratio of combined ethylene oxide to total ester was 3.8 to 1. The emulsion was stable to dilution with hard water.

Example 12

A laundry wax suitable for dispersion in a hot starch solution was prepared by melting and mixing together 35% paraffin wax, 45% hydrogenated fish oil, 15% of the ester of Example 1 and 5% of the ether of Example 3. The ratio of combined ethylene oxide to total ester in this emulsifier was 1.9 to 1.

After cooling, the composition prepared as above was solid, and when dropped into a boiling starch solution, such as one used for starching clothes, was found to disperse readily throughout the solution.

If desired, a dye such as a bluing can be included in a wax composition prepared as in the foregoing example.

The invention is not limited to the use of esters and ethers containing the same fatty acid nor is it limited to esters and ethers with the same polyhydroxylic residue.

Example 13

An emulsifier for paraffin wax was prepared by mixing together 50 parts of the ester of Example 2 and 50 parts of the ether of Example 3. This composition had a value for the ratio combined ethylene oxide to total ester of 5.03 to 1.

The invention is not limited to the emulsifiers or the emulsions of the preceding examples but such are given merely for the guidance of those skilled in the art so that they can practice the invention. An emulsion such as that prepared in accordance with Example 5 can be used to spray on to paper stock, fabric, or the like for the purpose of modifying the surface thereof and decreasing absorbency. Because of its stability to dilution with hard water the emulsion can be marketed in a concentrated form and can be diluted with ordinary unsoftened water at the place of use. Such stability is of very great advantage as will be apparent.

In some usages it is possible to reduce the amount of emulsifier; such, for instance, is the case where the emulsion can conveniently be kept agitated. For example, it may be desired to impregnate paper fibres in the beater and in such a case the quantity of emulsifier necessary to keep the wax suspended would be less than in the case where the wax emulsion was to be stored in a quiet condition and applied by spraying a portion withdrawn from time to time.

The concentrated paraffin wax emulsions produced by the aid of my combination emulsifier are stable, and may be diluted with hard water without loss of emulsion stability. Such diluted emulsions can be used very conveniently for wet waxing of paper, textiles, and the like. On long storage, however, particularly when agitated, there is a slight tendency for a small proportion of the wax to crystallize out from the disperse phase, in small, thin flakes. This effect, whose rate tends to increase with increasing hardness of the diluting water, is entirely different from a true breaking of the emulsion. An imperfect emulsion breaks down to give a curdy, flocculent precipitate, entirely different in physical character, ease of removal, and technical significance from the wax crystallization.

I have found that the wax separation, when undesirable, can be prevented, or reduced to the point at which it is no longer of practical importance, by the further addition of certain surface active agents to the freshly-made dilution, or to the concentrated emulsion immediately before dilution. For this, certain alkyl aryl sodium sulfonates, and dialkyl sulfosuccinates, particularly dioctyl sodium sulfosuccinate have been found useful.

In the case of the substituted aryl sodium sulfonates, such as the product sold by the National Aniline & Chemical Co. under the trade-mark "Nacconol NRSF," the amounts needed depend on the hardness of the water used and the degree of crystallization suppression desired, and may be as much as that of the $A+B$ combination.

The dioctyl sodium sufosuccinate is effective over a range of concentrations, but works best at about 15% of $A+B$. It may be added in the dry state, or conveniently as a concentrated solution, the usual form in which it is marketed. Thus, when the concentrated emulsion of Example 5 is diluted sevenfold by addition of water containing 50 P. P. M. of calcium chloride, or an equivalent amount of calcium ions, addition of 1 part of dioctyl sodium sulfosuccinate per 7 parts of $A+B$ to the finished dilution confers satisfactory stability against wax separation, even when shaken.

The following tabulation is offered by way of examples of the preparation of emulsions with oil phases of various types. Several further emulsifier combinations are also shown in these examples. In general the emulsions were prepared by simply mixing the emulsifier with the oil phase (melted if necessary) and then adding the water (at about the same temperature) with stirring meanwhile. The emulsions of these examples were very readily prepared and showed useful properties. They exhibited variations in viscosity, particle size, behavior on dilution, stability in storage, etc., as would be expected. This method of preparing my emulsions is much easier than that required to prepare emulsions using a soap as the emulsifier. The soap-type emulsions usually require vigorous agitation, homogenization or special milling procedure.

| Example | Oil phase | Parts of oil phase | Parts of water | A-type emulsifier | Parts | B-type emulsifier | Parts | Emulsion type |
|---|---|---|---|---|---|---|---|---|
| 14 | Stearin | 40 | 53 | Prod. Ex. 1 | 3.5 | Prod. Ex. 3 | 3.5 | O/W. |
| 15 | Beeswax | 40 | 153 | do | 3.5 | do | 3.5 | O/W. |
| 16 | do | 40 | 53 | do | 3.5 | do | 3.5 | O/W solid cold. |
| 17 | Mannide dipalmitate | 40 | 53 | do | 3.5 | do | 3.5 | O/W. |
| 18 | Refined mineral oil | 40 | 53 | Sorbitan mononaphthenate.¹ | 3.5 | do | 3.5 | O/W. |
| 19 | Mineral seal oil | 40 | 53 | Sorbitan (1) monolaurate | 3.5 | Sorbitan (1) monolaurate reacted with 20 mols ethylene oxide. | 3.5 | O/W. |
| 20 | Cottonseed oil | 40 | 53 | Sorbitan (2) monooleate | 3.5 | Sorbitan (2) monooleate reacted with 20 mols ethylene oxide. | 3.5 | O/W. |
| 21 | Corn oil | 40 | 53 | Prod. Ex. 1 | 3.5 | Prod. Ex. 3 | 3.5 | O/W. |
| 22 | Castor oil | 40 | 53 | do | 3.5 | do | 3.5 | O/W. |
| 23 | Hydrogenated castor oil | 40 | 53 | do | 3.5 | do | 3.5 | O/W. |
| 24 | Olive oil | 40 | 53 | Sorbitan (1) monolaurate | 3.5 | Sorbitan (1) monolaurate reacted with 20 mols ethylene oxide. | 3.5 | O/W. |
| 25 | White mineral oil (65 sec. Say.) | 40 | 53 | Prod. Ex. 1 | 3.5 | Prod. Ex. 3 | 3.5 | O/W. |
| 26 | Naphthenic acid (commercial, apparent molecular weight 282) | 80 | 150 | do | 7.0 | do | 7.0 | O/W. |
| 27 | Naphthenic acid (commercial, apparent molecular weight 191) | 80 | 150 | Sorbitan (1) monolaurate | 7.0 | Sorbitan (1) monolaurate reacted with 20 mols ethylene oxide. | 7.0 | O/W. |
| 28 | Scale paraffin wax | 80 | 106 | Prod. Ex. 1 | 3.5 | Prod. Ex. 3 | 3.5 | O/W. |
| 29 | do | 20 | 27 | do | 3.5 | do | 3.5 | O/W. |
| 30 | Paraffin base oil | 85 | 900 | Sorbitan (1) monolaurate | 7.5 | Mannitan monooleate reacted with 16 mols of ethylene oxide. | 7.5 (3) | O/W. |
| 31 | do | 85 | 900 | Mannitan (3) monooleate | 3.75 | Mannitan monooleate reacted with 12 mols of ethylene oxide. | 11.25 (3) | O/W. |
| 32 | do | 85 | 900 | Monolaurates of mannitan and glycerol (4). | 7.5 | Mannitan dilaurate reacted with 12 mols of ethylene oxide. | 7.5 (5) | O/W. |
| 33 | Refined mineral oil | 56 | 40 | Prod. Ex. 1 | 2.0 | Prod. Ex. 3 | 2.0 | O/W. |
| 34 | Mineral seal oil | 50 | 119 | Sorbitan (1) monolaurate | 12.0 | Sorbitan monolaurate reacted with 20 mols of ethylene oxide. | 19.0 (1) | O/W. |
| 35 | Scale wax | 40 | 53 | Glycerol monopalmitate | 3.5 | Prod. Ex. 3 | 3.5 | O/W. |
| 36 | Orange oil | 40 | 53 | Sorbitan monolaurate (1) | 3.5 | Sorbitan (1) monolaurate reacted with 20 mols ethylene oxide. | 3.5 | O/W. |
| 37 | Benzene | 40 | 53 | Prod. Ex. 1 | 3.5 | Prod. Ex. 3 | 3.5 | O/W. |

(1) Sorbitan monolaurate is the lipophilic reaction product of 1 mol sorbitol and 1 mol commercial lauric acid under conditions analogous to Example 1, supra.
(2) Sorbitan monoleate is the lipophilic reaction product of 1 mol sorbitol and 1 mol commercial oleic acid under conditions analogous to Example 1, supra.
(3) Mannitan monooleate is the lipophilic reaction product of 1 mol mannitol and 1 mol commercial oleic acid under conditions analogous to Example 1, supra.
(4) "Monolaurates of mannitan and glycerol" is the lipophilic reaction product of the alcoholysis of 1 mol coconut oil with 2 mols mannitol, the product consisting chiefly of about 2 mols mannitan monolaurate and 1 mol glycerol monolaurate.
(5) Mannitan dilaurate is the lipophilic reaction product of 1 mol mannitol and 2 mols commercial lauric acid under conditions analogous to Example 1, supra.

(¹) Sorbitan mononaphthenate is the lipophilic reaction product of 1 mol sorbitol and 1 mol naphthenic acid (apparent molecular weight 191) under conditions analogous to Example 1, supra.

Many of the emulsions prepared according to the invention show marked resistance to breaking in the presence of electrolytes. The emulsion of Example 32, for example, can be made with water having a hardness of 2000 parts per million as CaCO₃ and still has good stability. The emulsion of Example 5 is extremely resistant to electrolytes and 1 part of the concentrated emulsion can be diluted with nine parts 10% hydrochloric acid or 10% potassium hydroxide without destroying the emulsion.

The invention has been described and illustrated by a number of examples, but it is to be understood that it is subject to many variations without departing from its spirit. The invention, is, therefore, to be limited only by the scope of the following claims.

I claim:

1. An emulsifier comprising the mixture of a lipophilic partial ester of a long chain fatty acid and a hydrophilic polyhydroxylic organic compound, and a highly hydrophilic hydroxypolyoxyethylene ether of a lipophilic partial ester of a long chain fatty acid and a hydrophilic polyhydroxylic organic compound, said hydroxy-polyoxyethylene ether containing at least 10 oxyethylene groups; said partial ester and hydroxy-polyoxyethylene ether being present in the mixture in such proportions that the ratio of oxyethylene groups in said hydroxy-polyoxyethylene ether to the total ester groups (both in the free ester and in the hydroxy-polyoxyethylene ether) is in the range of from about 1.5 to 9.0.

2. An emulsifier comprising the mixture of a lipophilic partial ester of a long chain fatty acid and a hydrophilic compound selected from the groups consisting of polyhydric alcohols, polyhydroxylic cyclic inner ethers of polyhydric alcohols, polyhydroxylic external ethers of polyhydric alcohols, and polyhydroxylic external ethers of polyhydroxylic cyclic inner ethers of polyhydric alcohols; and a highly hydrophilic hydroxy-polyoxyethylene ether of a lipophilic partial ester of a long chain fatty acid and a hydrophilic compound selected from the said groups, said hydroxy-polyoxyethylene ether containing at least 10 oxyethylene groups; said partial ester and said hydroxy-polyoxyethylene ether being present in the mixture in such proportions that the ratio of oxyethylene groups in said hydroxy-polyoxyethylene ether to the total ester groups (both in the free ester and in the hydroxy-polyoxyethylene ether) is in the range of from about 1.5 to 9.0.

3. An emulsifier comprising the mixture of a partial ester of a polyhydroxylic cyclic inner ether of a hexitol and a fatty acid of at least 12 carbon atoms; and a highly hydrophilic hydroxy-polyoxyethylene ether of a lipophilic long chain fatty acid partial ester of a compound selected from the group consisting of polyhydric alcohols, the polyhydroxy cyclic inner ethers of polyhydric alcohols, polyhydroxy external ethers of polyhydric alcohols, and polyhydroxy external ethers of polyhydroxy cyclic inner ethers of polyhydric alcohols, the combination having a ratio of oxyethylene groups in the said polyoxyethylene ether to the total ester groups (both in the free ester and in the polyoxyethylene ether) of from about 1.5 to 9.0.

4. An emulsifier comprising the mixture of a partial ester of a polyhydroxylic cyclic inner ether of a hexitol and a fatty acid with at least 12 carbon atoms; and a highly hydrophilic hydroxy-polyoxyethylene ether of a partial ester of a polyhydroxylic cyclic inner ether of a hexitol and a fatty acid with at least 12 carbon atoms; the mixture having a ratio of oxyethylene groups in the said polyoxyethylene ether to the total ester groups (both in the free ester and in the polyoxyethylene ether) of from about 1.5 to 9.0.

5. An emulsifier comprising the mixture of a lipophilic partial ester of a polyhydroxylic cyclic inner ether of a hexitol and a fatty acid of at least 12 carbon atoms, the ratio hydroxyl value to ester value in the said partial ester being from about 3 to 1; and a highly hydrophilic hydroxy-polyoxyethylene ether of a lipophilic long chain fatty acid partial ester of a compound selected from the group consisting of polyhydric alcohols, the polyhydroxy cyclic inner ethers of polyhydric alcohols, polyhydroxy external ethers of polyhydric alcohols, and polyhydroxy external ethers of polyhydroxy cyclic inner ethers of polyhydric alcohols, the combination having a ratio of oxyethylene groups in the said polyoxyethylene ether to the total ester groups (both in the free ester and in the polyoxyethylene ether) of from about 1.5 to 9.0.

6. An emulsifier comprising the mixture of a lipophilic partial ester of a polyhydroxylic cyclic inner ether of a hexitol and a fatty acid with at least 12 carbon atoms, the ratio hydroxyl value to ester value in said partial ester being from about 3 to 1; and a highly hydrophilic hydroxy-polyoxyethylene ether of a lipophilic partial ester of a polyhydroxylic cyclic inner ether of a hexitol and a fatty acid with at least 12 carbon atoms, said polyoxyethylene ether containing from about 10 to 30 oxyethylene groups; and the mixture having a ratio of oxyethylene groups in the said polyoxyethylene ether to the total ester groups (both in the free ester and in the polyoxyethylene ether) of from about 1.5 to 9.0.

7. A composition for emulsifying hard paraffin waxes and water, comprising the mixture of a lipophilic partial ester of a fatty acid with at least 12 carbon atoms and a polyhydroxylic cyclic inner ether of a hexitol, the ratio hydroxyl value to ester value in the said partial ester being from about 3 to 1.5; and a highly hydrophilic hydroxy-polyoxyethylene ether of a lipophilic partial ester of a fatty acid with at least 12 carbon atoms and a polyhydroxylic cyclic inner ether of a hexitol, said polyoxyethylene ether containing from about 10 to 30 oxyethylene groups; the composition having a ratio of oxyethylene groups in said polyoxyethylene ether to the total ester groups (both in the free ester and in the polyoxyethylene ether) of from about 4 to 5.

8. An emulsifier comprising the mixture of a partial palmitic acid ester of cyclic inner ether of mannitol, which ester consists largely of mannitan monopalmitate; and a highly hydrophilic hydroxy-polyoxyethylene ether of said ester containing about 20 oxyethylene groups; the combination having a ratio of oxyethylene groups in said polyoxyethylene ether to total ester groups (both in the free ester and in the polyoxyethylene ether) of from about 1.5 to 9.0.

9. An emulsion comprising an oil phase; water; and a mixed emulsifier comprising a lipophilic partial ester of a long chain fatty acid and a hydrophilic compound selected from the group consisting of polyhydric alcohols, polyhydroxylic cyclic inner ethers of polyhydric alcohols, polyhydroxylic external ethers of polyhydric alcohols, and polyhydroxylic external ethers of polyhydroxylic cyclic inner ethers of polyhydric alcohols, and a highly hydrophilic hydroxy-polyoxyethylene ether of a lipophilic partial ester of a long chain fatty acid and a hydrophilic compound selected from the said group, said hydroxy-polyoxyethylene ether containing at least 10 oxyethylene groups, and the ratio of oxyethylene groups in the hydroxy-polyoxyethylene ether to total ester groups (both in the free ester and in the hydroxy-polyoxyethylene ether) being from about 1.5 to 9.0.

10. An emulsion comprising wax; water; and a mixed emulsifier comprising a lipophilic partial ester of a fatty acid with at least 12 carbon atoms and a hydrophilic compound selected from the group consisting of polyhydric alcohols, polyhydroxylic cyclic inner ethers of polyhydric alcohols, polyhydroxylic external ethers of polyhydric alcohols, polyhydroxylic external ethers of polyhydroxylic cyclic inner ethers of polyhydric alcohols, and a highly hydrophilic hydroxy-polyoxyethylene ether of a lipophilic partial ester of a fatty acid with at least 12 carbon atoms and a hydrophilic compound selected from the said group, said hydroxy-polyoxyethylene ether containing from 10 to 30 oxyethylene groups, and the ratio of the oxyethylene groups in the hydroxy-polyoxyethylene ether to total ester groups (both in the free ester and in the hydroxy-polyoxyethylene ether) being from about 1.5 to 9.0.

11. An emulsion comprising an oil phase, water, and a combination emulsifier comprising the combination of a lipophilic partial ester of a polyhydroxylic cyclic inner ether of a hexitol, and a fatty acid of at least 12 carbon atoms, the ratio hydroxyl value to ester value in said partial ester being from about 3 to 1, and a highly hydrophilic hydroxy-polyoxyethylene ether of a partial long chain fatty acid ester of a compound selected from the group consisting of polyhydric alcohols, the polyhydroxy cyclic inner ethers of polyhydric alcohols, polyhydroxy external ethers of polyhydric alcohols, and polyhydroxy external ethers of polyhydroxy inner ethers of polyhydric alcohols, said polyoxyethylene ether containing from about 10 to 30 oxyethylene groups, the combination having a ratio of oxyethylene groups in the polyoxyethylene ether to total ester groups (both in the free ester and in the polyoxyethylene ether) of from about 4 to 5.

12. An emulsion comprising wax, water, and a combination emulsifier comprising the combination of a lipophilic partial ester of a polyhydroxylic cyclic inner ether of a hexitol, and a fatty acid of at least 12 carbon atoms, the ratio hydroxyl value to ester value in said partial ester being from about 3 to 1, and a highly hydrophilic hydroxy-polyoxyethylene ether of a partial long chain fatty acid ester of a compound selected from the group consisting of polyhydric alcohols, the polyhydroxy cyclic inner ether of polyhydric alcohols, polyhydroxy external ethers of polyhydric alcohols, and polyhydroxy external ethers of polyhydroxy inner ethers of polyhydric alcohols, said polyoxyethylene ether containing from about 10 to 30 oxyethylene groups, the combination having a ratio of oxyethylene groups in the polyoxyethylene ether to the total ester groups (both in the free ester and in the polyoxyethylene ether) of from about 1.5 to 9.0.

13. An emulsion comprising paraffin wax; water; and a mixed emulsifier comprising a lipophilic partial ester of a fatty acid with at least 12 carbon atoms and a polyhydroxylic cyclic inner ether of a hexitol, said ester having a ratio hydroxyl value to ester value of from about 3 to 1.5, and a highly hydrophilic hydroxy-polyoxyethylene ether of a lipophilic partial ester having a ratio hydroxyl value to ester value of from about 3 to 1.5 and being an ester of a fatty acid with at least 12 carbon atoms and a polyhydroxylic cyclic inner ether of a hexitol, said hydroxy-polyoxyethylene ether containing from 10 to 30 oxyethylene groups, and the mixed emulsifier having a ratio of oxyethylene groups in the polyoxyethylene ether to total ester groups (in both the free ester and the polyoxyethylene ether) of from about 4 to 5.

14. An emulsion in accordance with claim 13 and further containing a proportion of dioctyl sodium sulfosuccinate sufficient to inhibit wax crystallization on dilution of the emulsion with hard water.

15. An emulsion comprising an oil phase, water, and a combination emulsifier comprising a partial palmitic acid ester of cyclic inner ether of mannitol, which ester consists largely of mannitan monopalmitate, and a highly hydrophilic hydroxy-polyoxyethylene ether of said ester containing about 20 oxyethylene groups, said combination having a ratio of oxyethylene groups in the polyoxyethylene ether to total ester groups (both in the free ester and in the polyoxyethylene ether) of from about 1.5 to 9.0.

16. An emulsion comprising wax, water, and a combination emulsifier comprising a partial palmitic acid ester of cyclic inner ether of mannitol, which ester consists largely of mannitan monopalmitate, and a highly hydrophilic hydroxy-polyoxyethylene ether of said ester containing about 20 oxyethylene groups, said combination having a ratio of oxyethylene groups in the polyoxyethylene ether to total ester groups (both in the free ester and in the polyoxyethylene ether) of from about 1.5 to 9.0.

17. An emulsion concentrate comprising by weight paraffin wax about 40 parts; water about 53 parts; about 3.5 parts of a partial palmitic acid ester of cyclic inner ether of mannitol, which ester consists largely of mannitan monopalmitate, and about 3.5 parts of a hydroxy-polyoxyethylene ether of said ester containing about 20 oxyethylene groups, said emulsion being capable of dilution with hard water without breaking.

18. An emulsion comprising an oil phase, water and a mixed emulsifier comprising a lipophilic partial ester of a long chain fatty acid and a hydrophilic polyhydroxylic organic compound, and a highly hydrophilic hydroxy-polyoxyethylene ether of a lipophilic partial ester of a long chain fatty acid and a hydrophilic polyhydroxylic organic compound, said hydroxy-polyoxyethylene ether containing at least 10 oxyethylene groups; said partial ester and said hydroxy-polyoxyethylene ether each being present in a substantial amount in the said mixed emulsifier and the ratio of oxyethylene groups in the hydroxy-polyoxyethylene ether to total ester groups (both in the free ester and in the hydroxy-polyoxyethylene ether) being from about 1.5 to 9.0.

WILLIAM C. GRIFFIN.